(12) United States Patent
Ribeiro

(10) Patent No.: US 7,063,064 B1
(45) Date of Patent: Jun. 20, 2006

(54) PROGRESSIVE COMBUSTION ENGINE

(76) Inventor: Marcos Ribeiro, 421 NE. 13 Ave., Pompano Beach, FL (US) 33060

( * ) Notice: Subject to any disclaimer, the term of this patent is extended or adjusted under 35 U.S.C. 154(b) by 0 days.

(21) Appl. No.: 11/097,914

(22) Filed: Apr. 4, 2005

(51) Int. Cl.
*F02D 13/06* (2006.01)

(52) U.S. Cl. .................................. 123/198 F; 123/585
(58) Field of Classification Search ............ 123/198 F, 123/198 DB, 198 DC, 585, 568.11
See application file for complete search history.

(56) References Cited

U.S. PATENT DOCUMENTS

| | | | | |
|---|---|---|---|---|
| 4,316,438 A | * | 2/1982 | Iizuka | 123/198 F |
| 4,550,704 A | * | 11/1985 | Barho et al. | 123/481 |
| 4,633,670 A | * | 1/1987 | Iwasa | 60/603 |
| 4,726,345 A | * | 2/1988 | Masaomi et al. | 123/506 |
| 5,553,575 A | * | 9/1996 | Beck et al. | 123/198 F |
| 5,826,563 A | * | 10/1998 | Patel et al. | 123/481 |
| 6,138,636 A | * | 10/2000 | Kohno et al. | 123/198 F |
| 6,202,412 B1 | * | 3/2001 | Lange et al. | 60/602 |
| 6,619,249 B1 | * | 9/2003 | Sakuragi et al. | 123/90.16 |
| 6,619,267 B1 | * | 9/2003 | Pao | 123/481 |
| 6,715,289 B1 | * | 4/2004 | Mader et al. | 60/612 |
| 6,886,524 B1 | * | 5/2005 | Hanada et al. | 123/198 F |

* cited by examiner

*Primary Examiner*—Noah P. Kamen
*Assistant Examiner*—Jason Benton
(74) *Attorney, Agent, or Firm*—Sanchelima & Assoc. P.A.

(57) ABSTRACT

A progressive internal combustion engine that improves fuel efficiency, power output, and decreases emissions having a standard four stroke operation; the intake stroke, compression stroke, power stroke, and exhaust stroke when cylinders are engaged. The progressive internal combustion engine provides for disengaging cylinders. When disengaged, a bypass valve opens, allowing the disengaged cylinder to operate free of compression. The progressive internal combustion engine may be utilized for gasoline, diesel and natural gas type engines.

8 Claims, 5 Drawing Sheets

PROGRESSIVE COMBUSTION ENGINE

BACKGROUND OF THE INVENTION

1. Field of the Invention

The present invention relates to engines, and more particularly, to internal combustion engines.

2. Description of the Related Art

Many designs for internal combustion engines have been designed in the past. None of them, however, include a progressive combustion engine that provides for engaging and disengaging predetermined cylinders for greater fuel efficiency.

In operation a fully loaded tractor-trailer vehicle requires approximately 400 horsepower to run. However, an empty tractor-trailer vehicle may only require approximately 180 horsepower to run. Disengaging a predetermined number of cylinder assemblies allows a driver to reduce horsepower and fuel when not needed.

Passenger vehicles are another example of inefficient horsepower and fuel utilization. Disengaging a predetermined number of cylinder assemblies allows an officer to reduce horsepower and fuel utilization when not needed, such as when the vehicle is idling at a traffic stop.

Of the numerous designs for reciprocating internal combustion engines, most of them comprise four stroke/cycle designs for each cylinder. These type of designs are inefficient when a vehicle having such an engine is stopped or when cruising at a predetermined speed.

There are no internal combustion engines to the best of applicant's knowledge that include means for engaging and disengaging cylinders to conserve fuel and improve engine efficiency.

SUMMARY OF THE INVENTION

A progressive internal combustion engine, comprising a housing structure; cylinder means encased in the housing structure; crankcase means affixed to the housing structure; crankshaft means positioned in the crankcase means; valve system means including an air intake valve, exhaust valve, and bypass valve. The valve system means is connected to the cylinder means; and actuating means to engage and disengage a predetermined number of the cylinder means.

Combustion means have four strokes within the cylinder means when engaged. The four strokes are an air intake stroke; a compression stroke; a power stroke; and an exhaust stroke. When disengaged, compression-free means within the cylinder means causes the bypass valve to be in an open position and the air intake valve and the exhaust valve to be in a closed position.

The progressive internal combustion engine further comprises a piston and piston rod. The piston and piston rod are assembled in the cylinder means. The piston rod is assembled to the crankshaft means in the crankcase means. A fuel injection system has a fuel injection inlet into the cylinder means.

When disengaged, the compression-free means within the cylinder means cause the fuel injection system to be in a non-operating mode while the bypass valve is in an open position, and the air intake valve and the exhaust valve are in a closed position. The actuating means includes a switch and a computer module. When actuated, the computer module sends an electronic signal to a solenoid for engaging and disengaging. When disengaged, fuel-air mixture within the cylinder assembly flows through the bypass valve, through a bypass port, and recycles through a muffler system to an intake.

It is therefore one of the main objects of the present invention to provide a progressive internal combustion engine that provides means for engaging and disengaging engine cylinders.

It is another object of this invention to provide a progressive internal combustion engine that conserves fuel.

It is another object of this invention to provide a progressive internal combustion engine that improves engine efficiency.

It is yet another object of this invention to provide such an engine that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
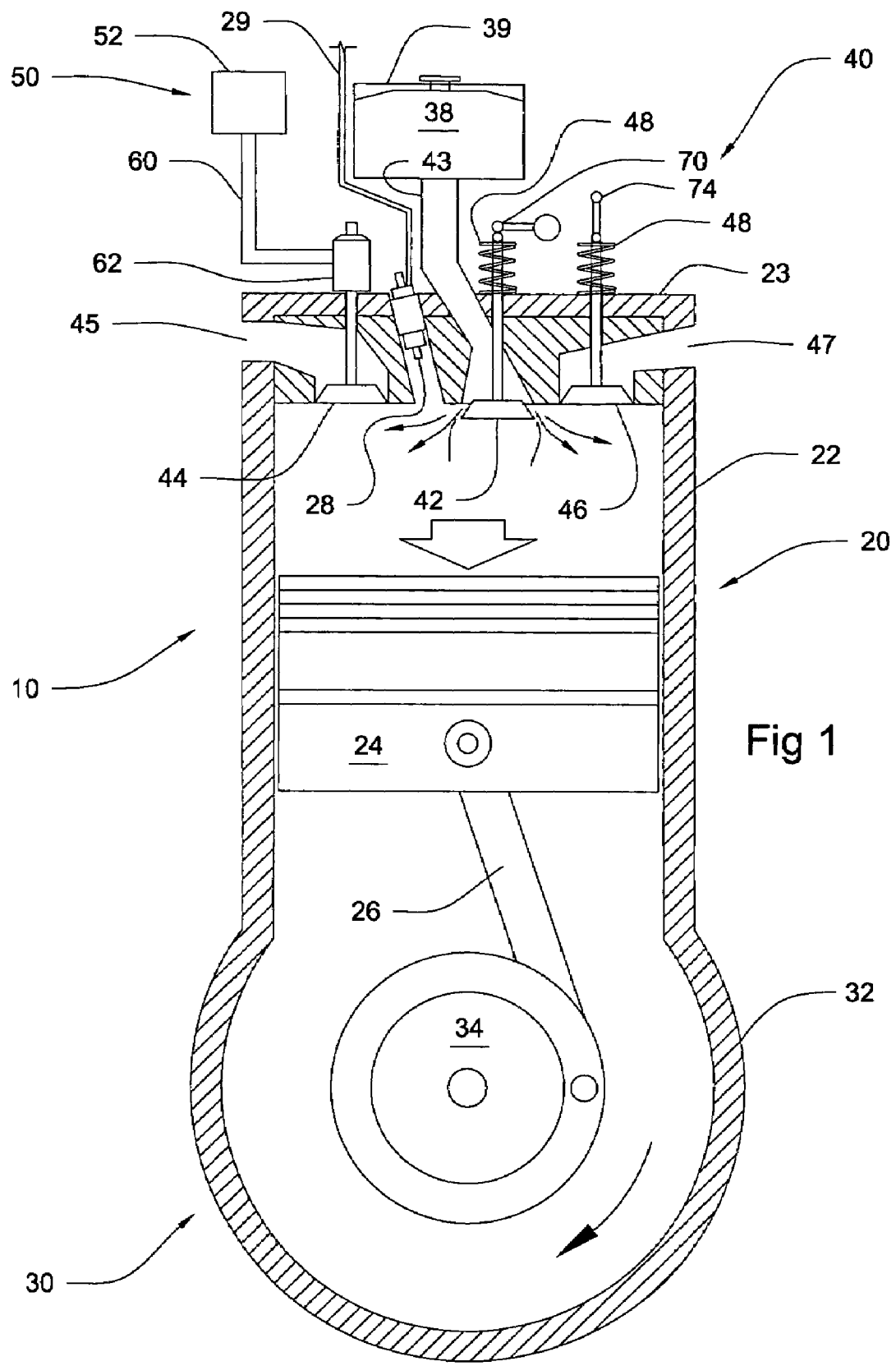
FIG. 1 is an elevational cross section through a crankshaft, piston, cylinder head, and valve system of an engaged cylinder of a progressive engine on an intake stroke.

Referring now to the drawings and particularly to FIG. 1, a progressive engine is shown at 10. It can be observed that it basically includes cylinder assembly 20, crankcase assembly 30, valve assembly 40, and solenoid assembly 50.

The progressive engine may consist of two or more cylinders and associated mechanisms assembled with it as described in this invention. A typical cylinder and associated mechanisms of a progressive engine is portrayed in FIG. 1 as provided in this invention. Only a portion of the cylinder assembly 20, crankcase assembly 30, valve assembly 40, and solenoid assembly 50 is shown in order to describe the invention. This partial illustration is sufficient to describe the invention. However, it is to be understood that variation in these elements of structure to obtain the same operation is within the scope and intent of the invention.

Cylinder assembly 20 is constructed in a suitable housing means to which crankcase assembly 30 is attached, likewise a housing for valve assembly 40 is also attached to cylinder assembly 20 to enclose external portions of valve assembly 40. A typical piston 24, piston rod 26, and crankshaft 34 are illustrated assembled within cylinder 22 and crankcase 32.

Assuming engine 10 is a gasoline model, an intake valve 42, spring 48, and intake valve cam 70 operate for the introduction of a fuel-air mixture into cylinder 22. Intake valve 42 is shown open. When cycled to open, the intake valve 42 admits the introduction of air through the air intake port 43. Arrows indicate the direction of the flow of air from the air intake port 43. At the precise predetermined and timed moment, fuel is injected into cylinder 22 from a fuel pump, not seen, through fuel line 29 and through fuel injector 28.

An exhaust valve 46, spring 48, and exhaust gas valve cam 74 operates for the elimination of burned gas from cylinder 22. Exhaust valve 46 is shown closed. When cycled to open, exhaust valve 46 permits the burned gas from the power stroke (described hereinafter) to be eliminated through the exhaust port 47. Arrows indicate the direction of the flow of the burned gas from exhaust port 47, seen in FIG. 4.

It is noted that the valve cams may be of a variety of styles, and springs 48 normally keep valves 42, and 46 closed, until cam actions by cams 70 and 74 operate at proper cycle to open the valves, which they serve. Fuel injector 28 is mounted at cylinder head 23 of cylinder 22. In addition, air filter housing 39 and air filter 38 may be of a variety of styles or as shown. It is noted that the valve system means include intake valve 42, exhaust valve 46; and bypass valve 44; and that combustion means has four strokes within cylinder assembly 20 when engaged. The four strokes are an air intake stroke; a compression stroke; a power stroke; and an exhaust stroke.

Referring now to FIG. 1 in conjunction with FIGS. 2 through 5 successively, the operation of the progressive engine of this invention will be described hereinafter.

FIG. 1 illustrates piston 24 starting in a downward direction for the first intake stroke cycle to draw the fuel-air mixture into cylinder assembly 20. The valve configuration for the intake stroke commands that the intake valve 42 be open, and the exhaust valve 46 and bypass valve 44 are closed. As piston 24 moves downward, air is drawn into the interior cavity of cylinder 22 until piston 24 reaches the bottom of its stroke for the completion of the first stroke. The direction of rotation of crankshaft 34 is shown in each of FIGS. 1 through 5. The air enters through intake port 43, as indicated by the arrows into cylinder 22.

Figure 2:
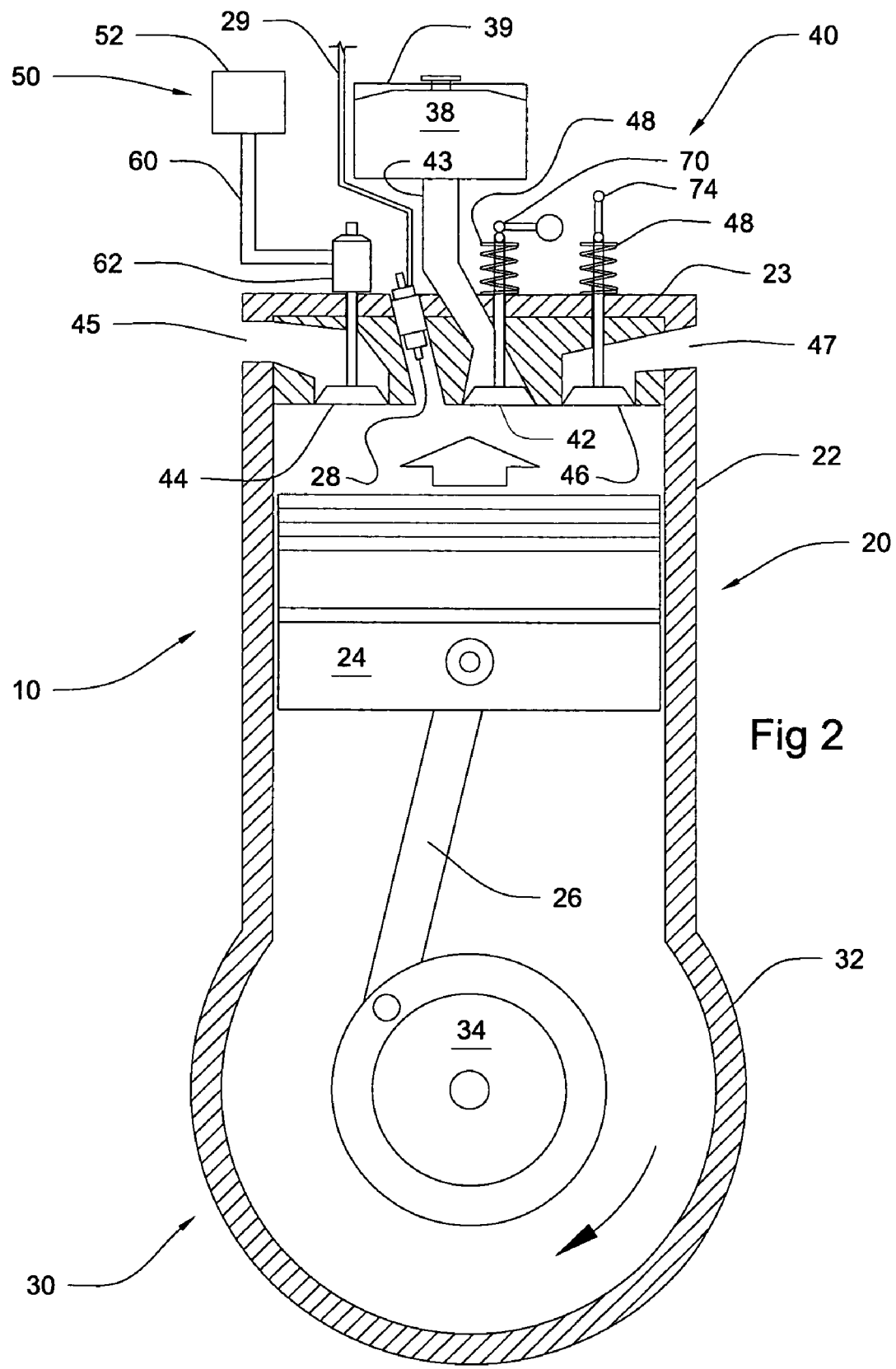
FIG. 2 is an elevational cross section through a crankshaft, piston, cylinder head, and valve system of the engaged cylinder of the progressive engine on a compression stroke.

As seen in FIG. 2, piston 24 travels in the upward direction to the position of top dead center. The valve configuration for the compression stroke commands that the intake valve 42, exhaust valve 46 and bypass valve 44 are closed.

Figure 3:
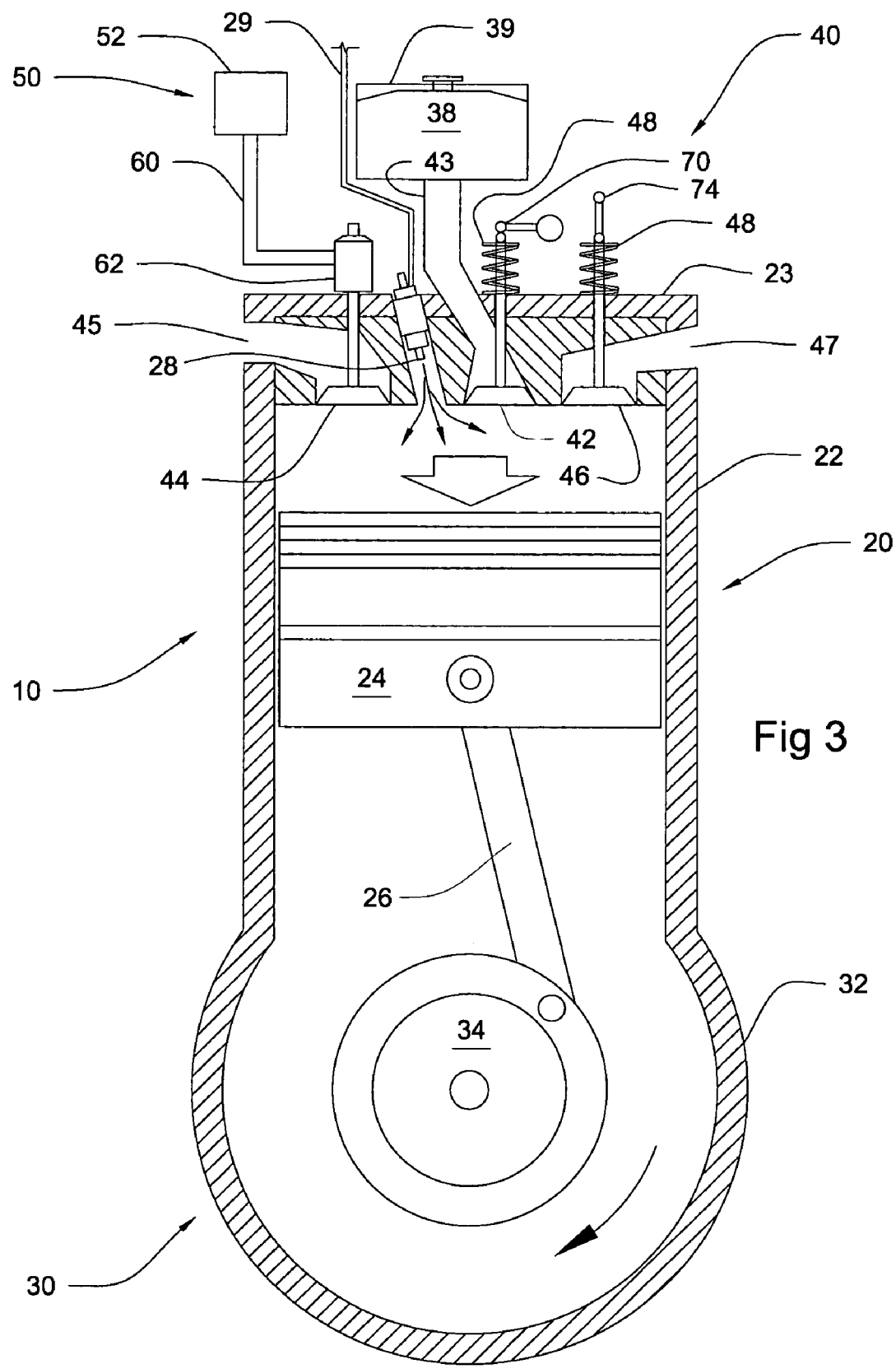
FIG. 3 is an elevational cross section through a crankshaft, piston, cylinder head, and valve system of the engaged cylinder of the progressive engine on a power stroke.

As seen in FIG. 3, as the fuel-air mixture ignites, expanding gas drives piston 24 in a downward direction a full longitudinal piston stroke. The valve configuration for the power stroke commands that intake valve 42, exhaust valve 46, and bypass valve 44 are closed.

Figure 4:
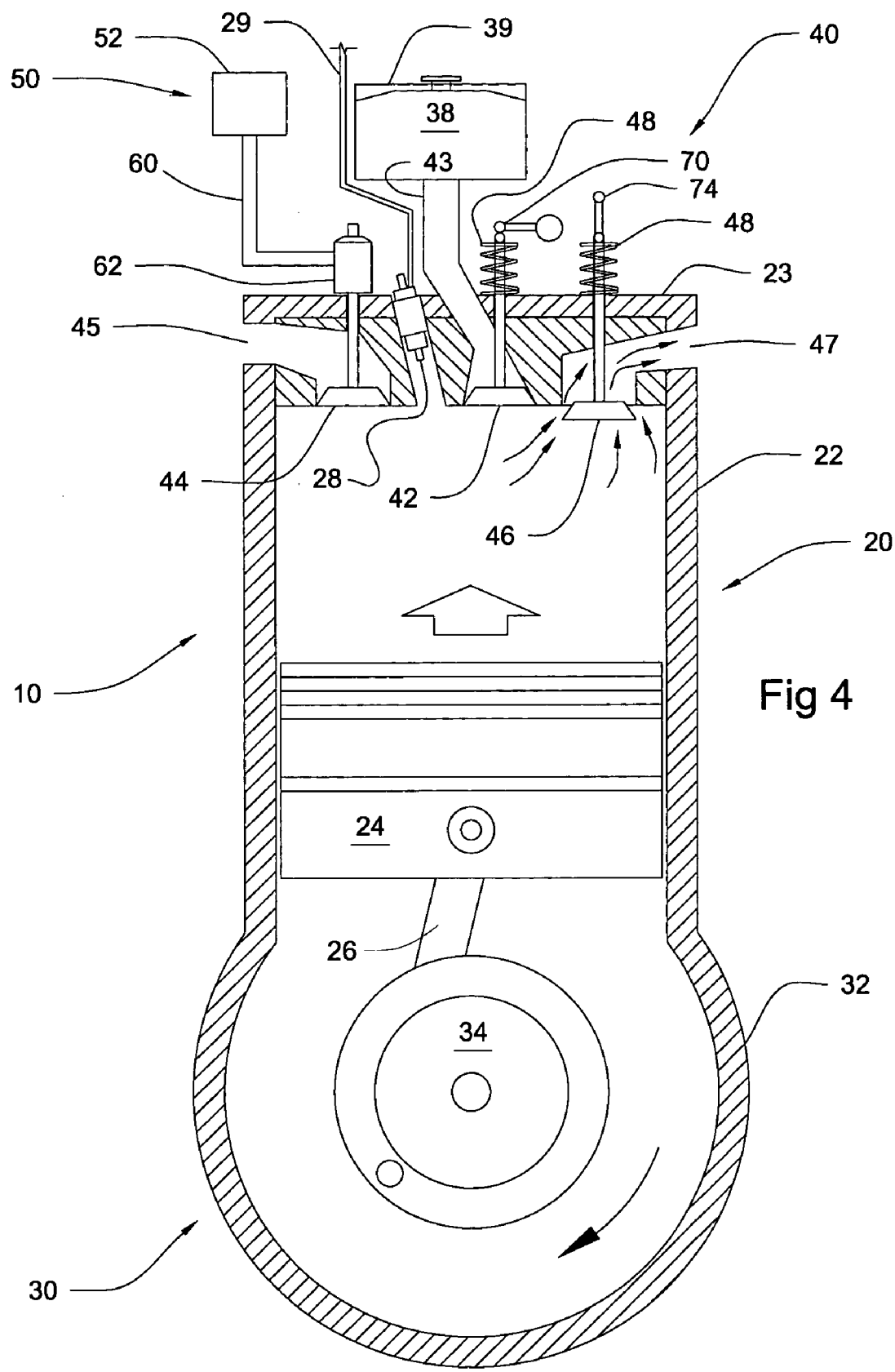
FIG. 4 is an elevational cross section through a crankshaft, piston, cylinder head, and valve system of the engaged cylinder of the progressive engine on an exhaust stroke.

Seen in FIG. 4 is the fourth stroke. In this stroke of an engaged progressive engine 10, the burned gases are eliminated by the upward movement of piston 24 through exhaust valve 46, which is now open, and out through the exhaust port 47 as illustrated. The valve configuration for the exhaust stroke commands that the exhaust valve 46 be open and the intake valve 42 and bypass valve 44 be closed. In the continuous operation of this engaged progressive engine, the intake stroke (FIG. 1) follows the exhaust stroke (FIG. 4).

Figure 5:
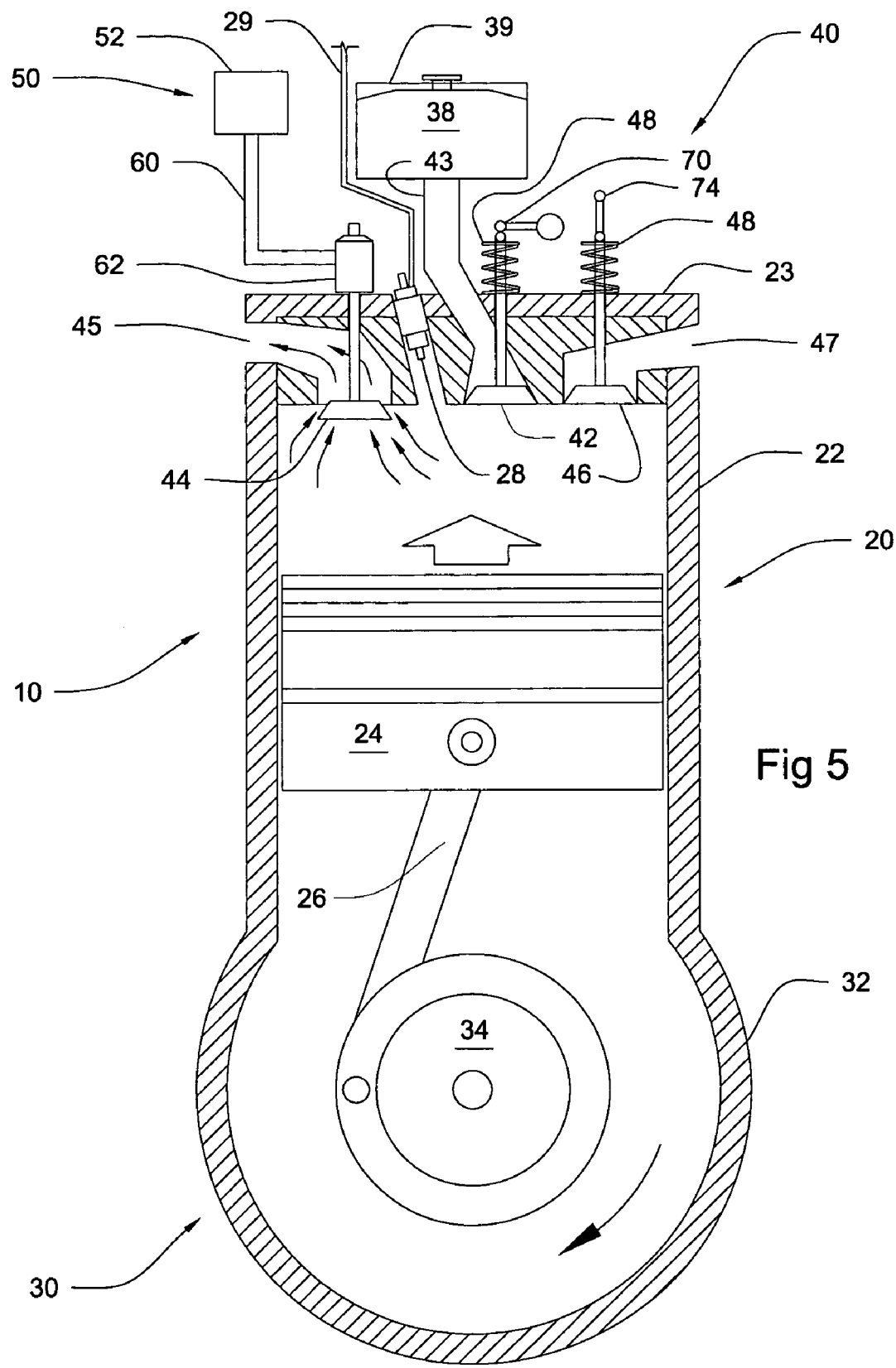
FIG. 5 is an elevational cross section through a crankshaft, piston, cylinder head, and valve system of a disengaged cylinder of the progressive engine on a bypass stroke.

Seen in FIG. 5 is the bypass stroke. In the bypass stroke of the progressive engine 10, piston 24 continues to travel in the normal upward and downward movement defined in each of the strokes described above. The valve configuration for the bypass stroke commands that the intake valve 42 and the exhaust valve 46 be closed, and that bypass valve 44 be open. Bypass valve 44 works in conjunction with fuel injector 28 to disengage each cylinder assembly 20 as desired. It is noted that actuating means to engage and disengage each cylinder assembly 20, comprise computer module 52, and a switch, not shown, accessible by a driver of the vehicle.

When disengaged by the driver at the switch, computer module 52 sends an electronic signal via connector 60 to bypass solenoid 62, to disengage cylinder assembly 20. Disengaging cylinder assembly 20 causes fuel injector 28 to disengage and bypass valve 44 to open. With bypass valve 44 in the open position, engine 10 does not develop any compression defined as compression-free means. All remaining fuel-air mixture within cylinder assembly 20 flows through bypass valve 44, through bypass port 45 and recycles to the intake through a muffler system, not shown.

This invention is suitable to be used with gasoline, diesel or compressed gas type fuel. Ignition can be accomplished with a spark plug, glow plug or the heat of compression in a traditional manner. Traditional components such as timing chains, gears etc. have not been depicted. It is understood that these components will be part of the final embodiment. The progressive internal combustion engine may consist of one or more cylinders and necessary mechanisms constructed of suitable materials as described in this invention. Only a portion of the mechanism means has been illustrated enough to describe the invention, it is to be understood that variation in these elements of structure to obtain the same results is within the scope of the invention.

As can be readily understood from the foregoing description of the invention, the present structure can be configured in different modes to provide the ability to construct a progressive engine. Accordingly, the foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A progressive internal combustion engine, comprising;
   A) a housing structure;
   B) cylinder means encased in said housing structure;
   C) crankcase means affixed to said housing structure;
   D) crankshaft means positioned in said crankcase means;
   E) valve system means including an air intake valve, exhaust valve, and bypass valve, said valve system means connected to said cylinder means; and
   F) actuating means to engage and disengage a predetermined number of said cylinder means.

2. The progressive internal combustion engine according to claim 1, further comprising combustion means having four strokes within said cylinder means when said engage, said four strokes are an air intake stroke; a compression stroke; a power stroke; and an exhaust stroke.

3. The progressive internal combustion engine according to claim 2, further comprising compression-free means within said cylinder means when said disengage, causing said bypass valve to be in an open position and said air intake valve and said exhaust valve to be in a closed position.

4. The progressive internal combustion engine according to claim 3, further comprising a piston and piston rod, said piston and piston rod being assembled in said cylinder means, said piston rod being assembled to said crankshaft means in said crankcase means.

5. The progressive internal combustion engine according to claim 4, further comprising a fuel injection system, said fuel injection system having a fuel injection inlet into said cylinder means.

6. The progressive internal combustion engine according to claim 5, further characterized in that said compression-free means within said cylinder means when said disengage, causes said fuel injection system to be in a non-operating mode while said bypass valve is in said open position and said air intake valve and said exhaust valve are in said closed position.

7. The progressive internal combustion engine according to claim 6, further characterized in that said actuating means includes a switch and a computer module, when actuated, said computer module sends an electronic signal to a solenoid for said engage and said disengage.

8. The progressive internal combustion engine according to claim 7, further characterized in that when said disengage, fuel-air mixture within said cylinder assembly flows through said bypass valve, through a bypass port, and recycles through a muffler system to an intake.

\* \* \* \* \*